United States Patent
Fujimatsu et al.

(10) Patent No.: US 9,147,121 B2
(45) Date of Patent: Sep. 29, 2015

(54) PERSON DETECTION DEVICE AND PERSON DETECTION METHOD

(71) Applicant: PANASONIC CORPORATION, Osaka (JP)

(72) Inventors: Takeshi Fujimatsu, Kanagawa (JP); Hiroyuki Yamamoto, Ishikawa (JP); Hirofumi Fujii, Kanagawa (JP); Takeshi Watanabe, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/344,636

(22) PCT Filed: Jun. 13, 2013

(86) PCT No.: PCT/JP2013/003719
§ 371 (c)(1),
(2) Date: Mar. 13, 2014

(87) PCT Pub. No.: WO2013/187068
PCT Pub. Date: Dec. 19, 2013

(65) Prior Publication Data
US 2014/0341472 A1 Nov. 20, 2014

(30) Foreign Application Priority Data
Jun. 15, 2012 (JP) .................. 2012-135771

(51) Int. Cl.
G06K 9/46 (2006.01)
G06K 9/00 (2006.01)
G08B 13/196 (2006.01)
H04N 7/18 (2006.01)

(52) U.S. Cl.
CPC .............. G06K 9/46 (2013.01); G06K 9/00362 (2013.01); G06K 9/00771 (2013.01); G08B 13/19602 (2013.01); H04N 7/18 (2013.01)

(58) Field of Classification Search
None
See application file for complete search history.

(56) References Cited

U.S. PATENT DOCUMENTS

2011/0279685 A1* 11/2011 Alahi et al. .................... 348/187
2012/0045149 A1 2/2012 Arai et al.
2012/0155769 A1* 6/2012 Yokomitsu et al. ........... 382/173

FOREIGN PATENT DOCUMENTS

| JP | 11-261868 | 9/1999 | | |
|---|---|---|---|---|
| JP | 2010-199713 | 9/2010 | | |
| JP | 2012-048690 | 3/2012 | | |
| WO | WO 2011/027483 | * | 3/2011 | ............... G06T 9/00 |
| WO | 2011/114610 | 9/2011 | | |

OTHER PUBLICATIONS

International Search Report in PCT/JP2013/003719, mail date is Jul. 30, 2013, together with an English language translation thereof.

* cited by examiner

Primary Examiner — Bhavesh Mehta
Assistant Examiner — David F Dunphy
(74) Attorney, Agent, or Firm — Greenblum & Bernstein P.L.C.

(57) ABSTRACT

The purpose of the invention is to increase accuracy in detecting a person on the basis of the size of an object detection region in an omni-directional image. A height-and-width switching section for switching between the height and the width of the object detection region on the basis of the position of the object detection region in the omni-directional image is provided. It is determined on the basis of the height and the width of the object detection region for which the height and the width are switched by the height-and-width switching section whether the object detection region is a person detection region. As a result, the person detection region and a shadow detection region can be correctly separated in the omni-directional image.

4 Claims, 9 Drawing Sheets

PERSON DETECTION DEVICE AND PERSON DETECTION METHOD

TECHNICAL FIELD

The present invention relates to a human detection apparatus and a human detection method, which detect a human body based on a size of an object detection region in an omnidirectional image.

BACKGROUND ART

Conventionally, when detecting a human body using motion information, determination on the size of an object detection region has been used for removing noise. However, an object with a motion to be detected may not only be a human body. A standard detection region unique to a human body (hereafter simply referred to as a standard human region) is prepared, and the size of an object detection region of an object with motion detected is compared with the standard human region so as to determine whether or not the object with the motion detected is a human body. More specifically, when the size of the object detection region is close to the size of the standard human region, the object detection region is determined as a human detection region.

In general, the size information of the standard human region is stored in a memory as a table in advance. The size information of the standard human region includes only one row of the image in the horizontal direction stored in the memory as illustrated in FIG. 1, and the size information of the other rows is substituted by the information stored.

In an omnidirectional image captured by an omnidirectional camera, in order to detect a human body by determining the size using the standard human region as described above, it is necessary to take change in the size of a captured image of a human body according to a position on an omnidirectional image into consideration. More specifically, as illustrated in FIG. 2, even when attempting to use the standard human region size information for one row in the horizontal direction, the size of the image changes into a radial direction from the image capturing center in an omnidirectional image. Accordingly, it is difficult to adopt the change using the size information for one row. In an omnidirectional image, even if the pixels are in the same row, the size of the pixels changes significantly if the pixels are in different columns.

Taking these problems into consideration, PTL1 discloses a technique for changing the size of the standard human region according to a distance from the center of the omnidirectional image.

In addition, conventionally, a human body and its shadow are separated using a detection region. The method utilizes the difference between the human detection region and a shadow detection region in aspect ratio, that is, while the human region is longer in the vertical direction in an aspect ratio, the shadow detection region is longer in the horizontal direction.

CITATION LIST

Patent Literature

PTL1
Japanese Patent Application Laid-Open No. 2010-199713

SUMMARY OF INVENTION

Technical Problem

However, the conventional technology for detecting a human body based on the size of an object detection region in an omnidirectional image is not performed taking a feature of an omnidirectional image into consideration sufficiently, and consequently, is not sufficiently accurate in detecting a human body.

The present invention has been conceived in view of this point, and it is an object of the present invention to provide a human detection apparatus and a human detection method capable of improving the accuracy in detecting a human body when detecting a human body based on the size of an object detection region in an omnidirectional image.

Solution to Problem

An aspect of the human detection apparatus according to the present invention includes a vertical-horizontal altering section that switches, according to a location of an object detection region on an omnidirectional image, a vertical size and a horizontal size of the object detection region; and a determining section that determines whether or not the object detection region is a human detection region, based on a vertical size and a horizontal size of the object detection region after the vertical size and the horizontal size are switched by the vertical-horizontal altering section.

An aspect of the human detection method according to the present invention includes switching, according to a location of an object detection region on an omnidirectional image, a vertical size and a horizontal size of the object detection region; and determining whether or not the object detection region is a human detection region, based on a vertical size and a horizontal size of the object detection region after the switching in the vertical size and the horizontal size.

Advantageous Effects of Invention

According to the present invention, the accuracy for detecting a human body can be improved when detecting a human body based on the size of an object detection region in an omnidirectional image.

BRIEF DESCRIPTION OF DRAWINGS

FIG. 5A is a diagram illustrating a display on an omnidirectional image;

FIG. 5B illustrates image-capturing by an omnidirectional camera;

FIG. 6A illustrates a human detection region (candidate region) formed by a candidate region forming section;

FIG. 6B illustrates alteration by the human region altering section;

DESCRIPTION OF EMBODIMENTS

In the following description, Embodiment of the present invention will be described in detail with reference to the drawings.

Figure 1:
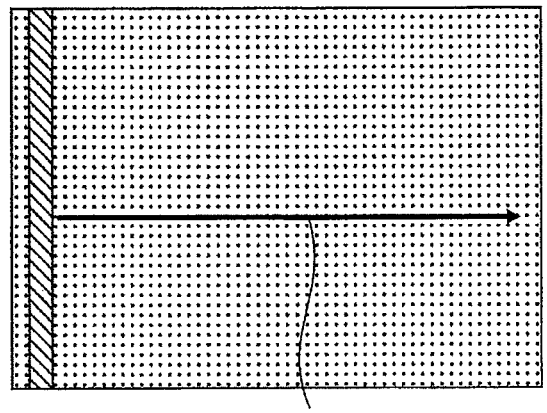
FIG. 1 is a diagram for describing a way that standard human region size information is stored in a memory.
Figure 2:
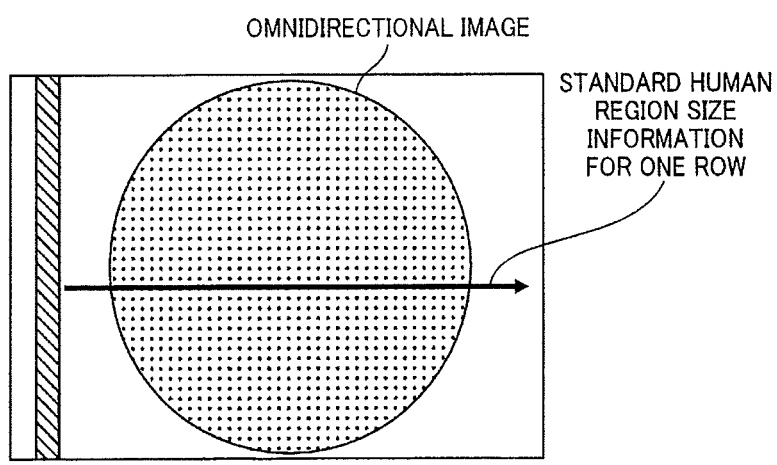
FIG. 2 is a diagram for describing a way that standard human region size information in an omnidirectional image is stored in a memory.
Figure 3:
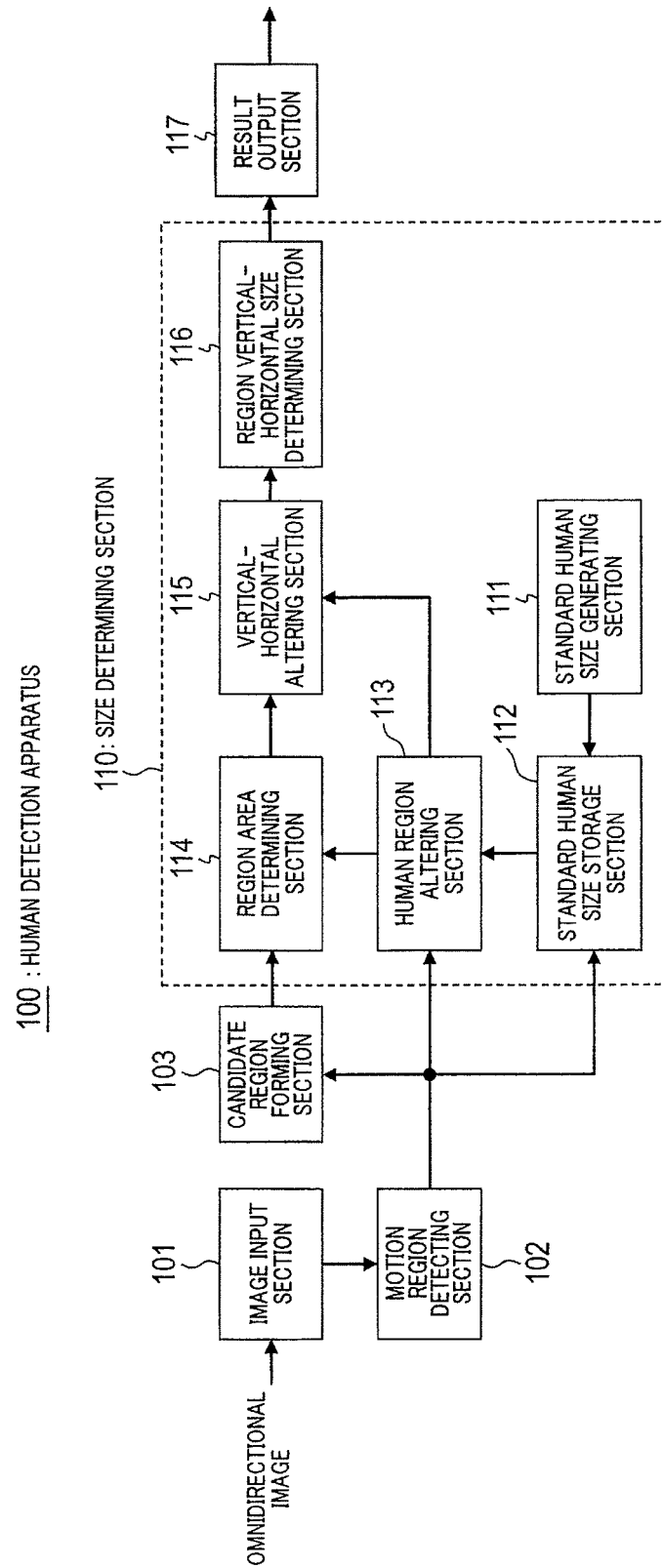
FIG. 3 is a block diagram illustrating a configuration of a human detection apparatus according to Embodiment.

FIG. 3 is a block diagram illustrating a configuration of a human detection apparatus according to Embodiment. Human detection apparatus 100 inputs an omnidirectional image captured by an omnidirectional camera to motion region detecting section 102 through image input section 101. Here, the term "omnidirectional" in Embodiment may be replaced with "entire circumference".

Motion region detecting section 102 detects a region with motion in an omnidirectional image, based on an inter-region difference value, for example. The information of the detected motion region is output to candidate region forming section 103. The information on the motion region is output to standard human size storage section 112 and human region altering section 113 in size determining section 110.

Candidate region forming section 103 forms a detection region surrounding the region with motion as a candidate human detection region, and outputs size information of the candidate human detection region to region area determining section 114. FIG. 6A illustrates a candidate human detection region formed by candidate region forming section 103.

Standard human size storage section 112 stores information on the standard human region size according to a distance from the imaging center of an omnidirectional image to an end of the image. Stated differently, standard human size storage section 112 holds a table in which a standard human region size is stored using a distance in the radial direction on the omnidirectional image as an address.

Figure 4:
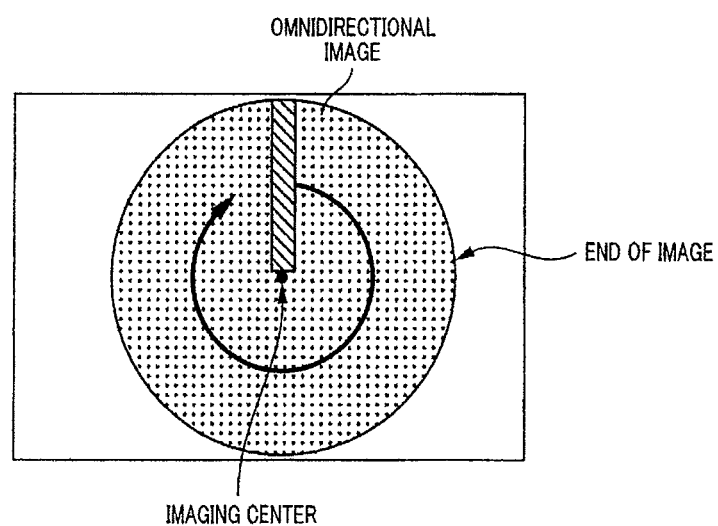
FIG. 4 is a diagram for describing standard human region size information stored in a standard human body size storage section.

FIG. 4 illustrates the table. The distance from the imaging center to the end of the image is divided into 30 sections for example, and standard human size storage section 112 stores 30 standard human region sizes. Subsequently, a standard human size corresponding to a location of the motion region detected by motion region detecting section 102 (the distance from the image-capturing center) is output from standard human size storage section 112 to human region altering section 113. In an actual image, a standard human region size stored in standard human size storage section 112 becomes smaller as the standard human size is farther away from the imaging center.

Figure 5A:
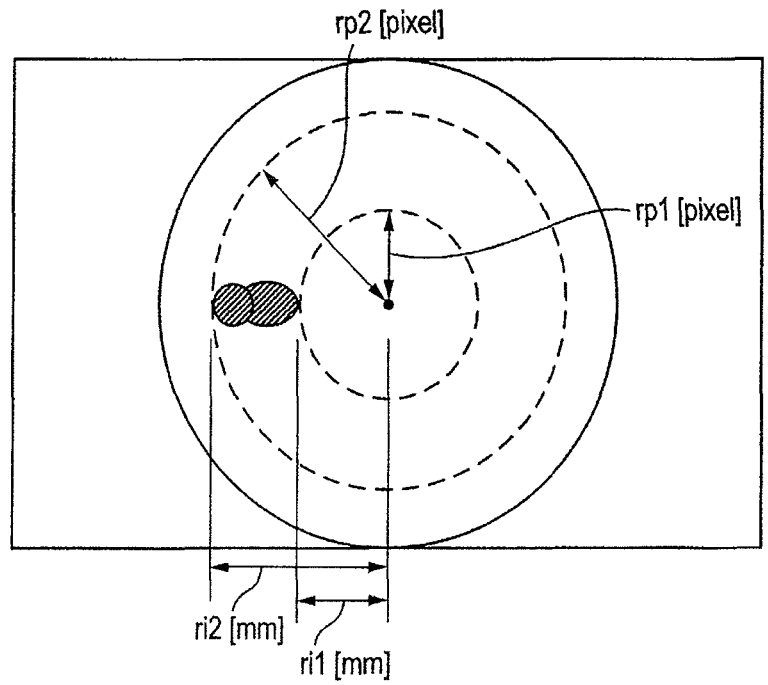
FIGS. 5A and 5B are diagrams for illustrating the process for generating a standard human size by a standard human size generating section.
Figure 5B:
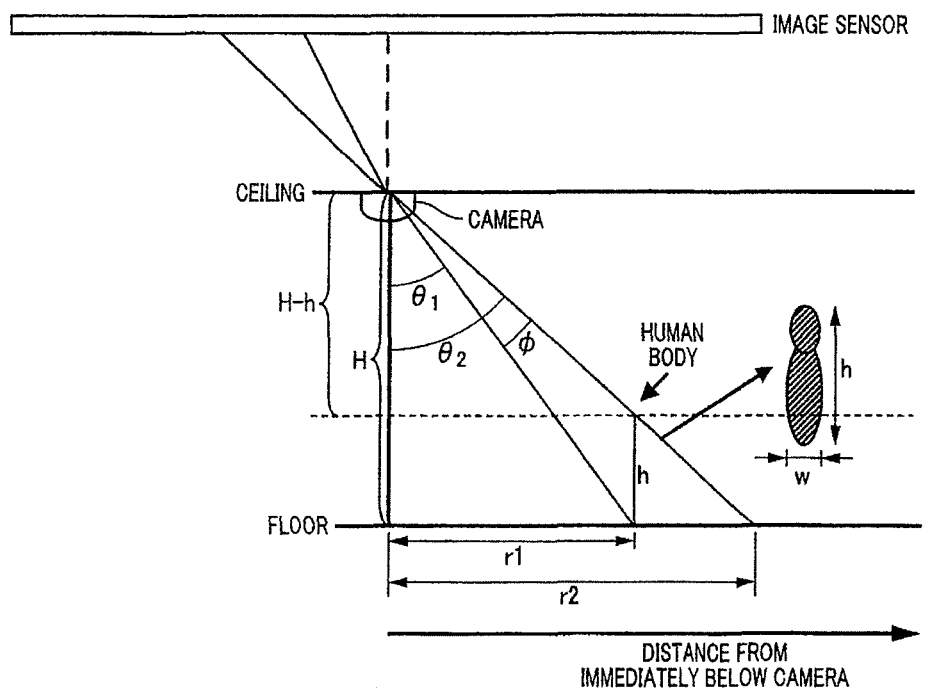

The information of the size of the standard human region stored in standard human size storage section 112 is generated by standard human size generating section 111 in advance. A process by standard human size generating section 111 for generating a standard human size will be described with reference to FIGS. 5A and 5B. FIG. 5A illustrates a display on an omnidirectional image, and FIG. 5B illustrates imaging by an omnidirectional camera. The vertical size and the horizontal size of the standard human region correspond to a height of a human body hei (vertical size) and a width of the human body wid (horizontal size) in FIG. 5A. In the following description, actual distances from the imaging center to the human body are denoted as ri1 and ri2, the numbers of pixels from the imaging center to the human body are denoted as rp1 and rp2, and the focal length of an omnidirectional camera is denoted as f. In addition, θ1, θ2, φ, H, h, r1, and r2 are defined as illustrated in FIG. 5B.

The following equations are satisfied since a stereographic imaging system is used for the camera.

[1]

$$r_{i1} = 2f\tan(\theta_1/2)$$

$$r_{i2} = 2f\tan(\theta_2/2),$$

where $r_{ij} = r_{pj}\rho \times 10^{-3}$ (Equations 1)

In addition, the following equations are satisfied with regard to height H of a camera and height h of a human body.

[2]

$$r_1 = H\tan\theta_1$$

$$r_1 = (H-h)\tan\theta_2$$ (Equations 2)

From the equations, when calculating a size of a human body (hei, wid) at a distance rp1 from the center, θ1, θ2, ri1 are eliminated, and ri2 and rp2 are calculated. Accordingly, the height of a human body (vertical size) hei at distance rp1 from the imaging center is represented by the following equation.

[3]

$$hei = r_{p2} - r_{p1}$$ (Equation 3)

Assuming that the width is in the same ratio in the actual space and the sensor space, the width (horizontal size) wid is represented by the following equation.

[4]

$$wid = \frac{r_{i2}}{r_1} w/(\rho \times 10^{-3})$$ (Equation 4)

As described above, a standard human size according to a location of the human body is generated by standard human size generating section 111, and a standard human region corresponding to the size is stored in standard human size storage section 112.

The configuration in FIG. 3 will be described further. Human region altering section 113 alters a size of a standard human region, based on the direction of the candidate human detection region from the center of an omnidirectional image.

The process by human region altering section 113 will be described with reference to FIGS. 6A and 6B. FIG. 6A illustrates a candidate human detection region formed by candidate region forming section 103, and FIG. 6B illustrates the alteration by human region altering section 113.

Figure 6B:
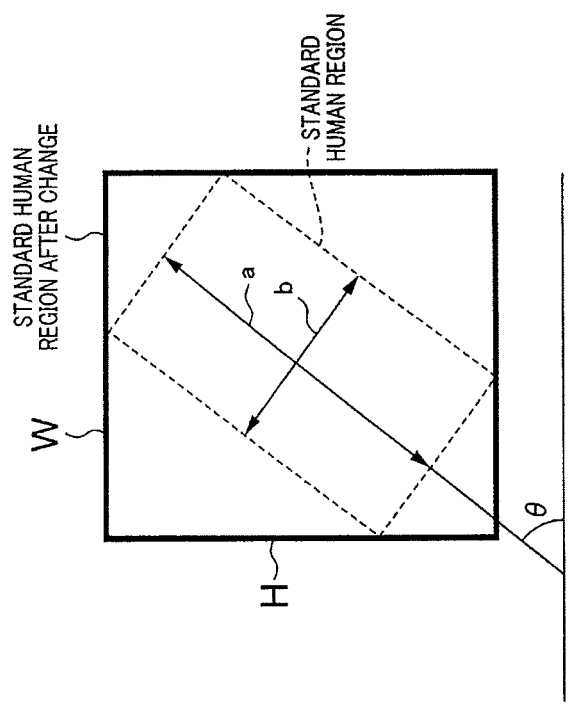
FIGS. 6A and 6B are diagrams for describing a process by a human region altering section.
Figure 6A:
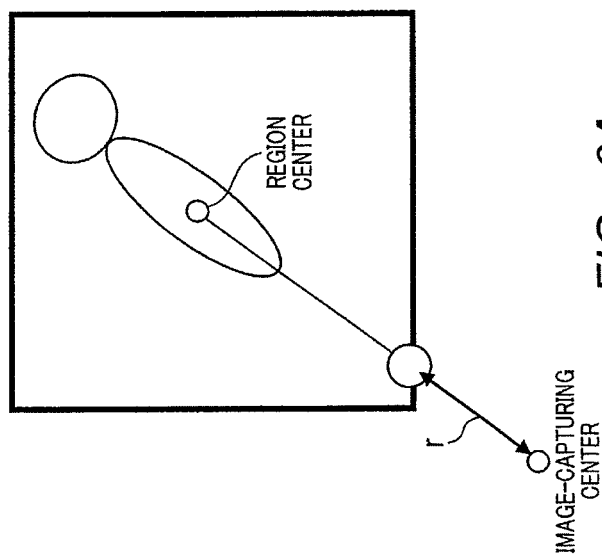

The broken line in FIG. 6B indicates a standard human region output from standard human size storage section 112. The solid line in FIG. 6B represents the standard human region after alteration by human region altering section 113. Human region altering section 113 alters a standard human region using the following alteration formula.

[5]

$$W = a\cdot\cos\theta + b\cdot\sin\theta$$

$$H = a\cdot\sin\theta + b\cdot\cos\theta$$ (Equations 5)

Here, W in Equation 5 denotes the horizontal size of the standard human region after alteration, H denotes the vertical size of the standard human region after the alteration, a denotes the vertical size of the standard human region stored in standard human size storage section 112, b denotes the horizontal size of the standard human region stored in standard human size storage section 112, and θ denotes an angle illustrated in FIG. 6B (stated differently, the direction of the candidate human detection region on the omnidirectional image).

Figure 7:
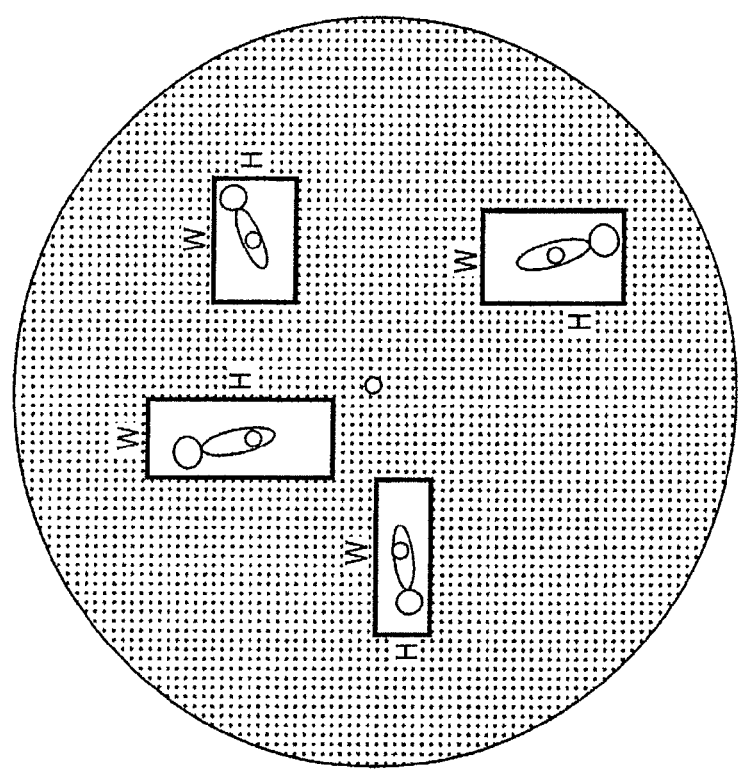
FIG. 7 illustrates a relative relationship between a human body and a region in an actual omnidirectional image.

The alteration performed by human region altering section 113 is performed so as to adjust the size of the standard human region (FIG. 6B) to fit the size of the human detection region (FIG. 6A) in an actual omnidirectional image. More specifically, as illustrated in FIG. 7, the relative relationship between a human body and a region in an actual omnidirectional image changes depending on a direction in which the human body is captured. Accordingly, human region altering section 113 alters the vertical size and the horizontal size of the standard human region for adjusting the sizes to the change. Human region altering section 113 outputs the standard human region obtained by the alteration to region area determining section 114.

Region area determining section 114 compares an area of the candidate human detection region formed by candidate region forming section 103 and an area of the standard human region obtained by the alteration by human region altering section 113, and determines that the candidate human detection region formed by candidate region forming section 103 is a human detection region when the area of the candidate human detection region is similar to the area of the standard human region (for example, when the difference or the ratio of the areas is within a certain range). In contrast, when the areas are not similar, region area determining section 114 determines that the candidate human detection region formed by candidate region forming section 103 is not a human detection region but a detection region of an object other than a human body. Region area determining section 114 outputs information of the candidate human detection region determined as the human detection region to vertical-horizontal altering section 115.

Vertical-horizontal altering section 115 switches the vertical size and the horizontal size of the object detection region according to the location (direction) of the object detection region determined as the human detection region on the omnidirectional image. In an actual operation, whether or not to switch the vertical size and the horizontal size of the object detection region is determined, based on the direction θ in which the human body is captured on the omnidirectional image, as illustrated in FIG. 8.

Figure 8:
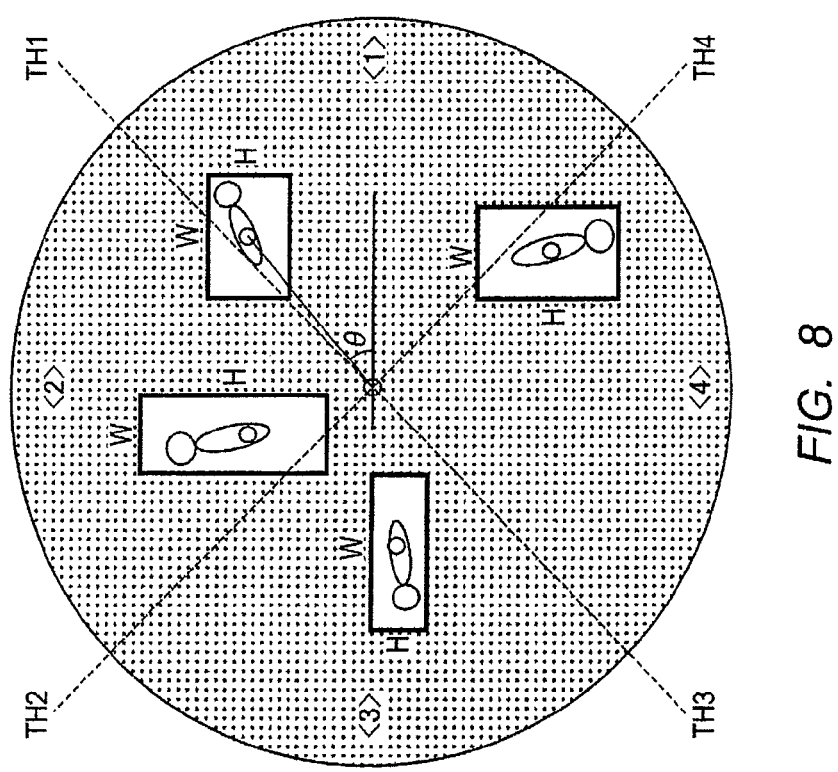
FIG. 8 is for describing a process for switching a vertical size and a horizontal size of an object detection region by a vertical-horizontal altering section.

In the case described in Embodiment, the omnidirectional image is divided into four regions using thresholds TH1, TH2, TH3, and TH4, and whether or not to switch the vertical size and the horizontal size of the object detection region is determined based on a divided region that direction θ belongs to, as illustrated in FIG. 8. More specifically, as illustrated in FIG. 8, when θ belongs to the following region <1> or <3>, the vertical size and the horizontal size of the object detection region are switched. When θ belongs to the following region <2> or <4>, the vertical size and the horizontal size of the object detection region are not switched. Note that, in the following equations, TH4 and TH3 are negative values.

$$TH4 \leq \theta < TH1 \qquad <1>$$

$$TH1 \leq \theta < TH2 \qquad <2>$$

$$TH2 \leq \theta < 180°, \text{ or } -180° \leq \theta < TH3 \qquad <3>$$

$$TH3 \leq \theta < TH4 \qquad <4>$$

Figure 9:
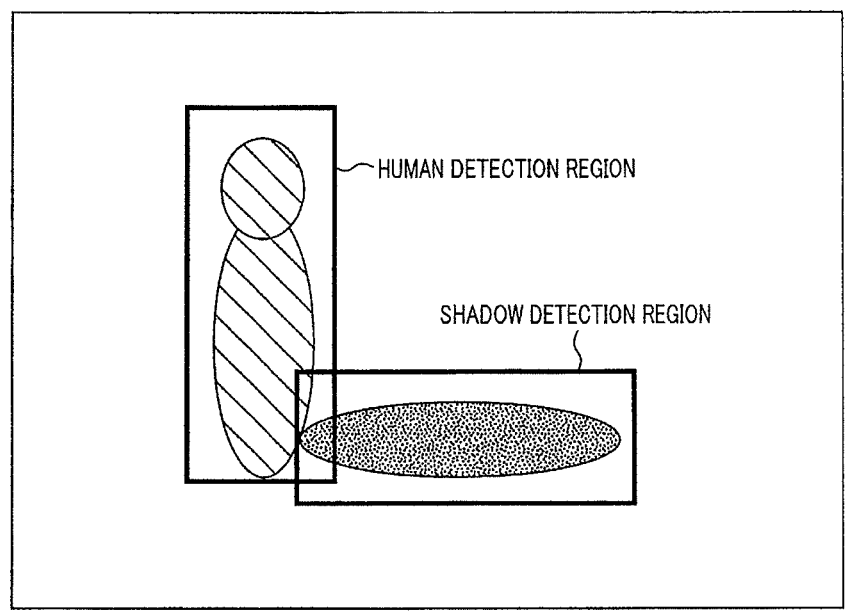
FIG. 9 illustrates shapes of a human detection region and a shadow detection region.

Region vertical-horizontal size determining section 116 determines whether or not the object detection region is the human detection region, based on the vertical-horizontal size of the object detection region output from vertical-horizontal altering section 115. More specifically, region vertical-horizontal size determining section 116 determines that the object detection region is a human detection region, when the ratio of the vertical size and the horizontal size of the object detection region is equal to or greater than the predetermined value (for example, when the vertical size of the object detection region is equal to or more than twice the horizontal size). This is based on the facts that the human detection region is vertically elongated, and that the shadow detection region is horizontally elongated, as illustrated in FIG. 9.

Here, the object detection region input to region vertical-horizontal size determining section 116 includes a shadow detection region of a human body, in addition to the human detection region. Region vertical-horizontal size determining section 116 can eliminate the shadow detection region of the person from the object detection region and extract only the human detection region by performing the determination described above.

The information of the human detection region obtained by region vertical-horizontal size determining section 116 is output to a monitor or others through result output section 117. With this, the human detection region detected by human detection apparatus 100 is displayed on the monitor.

As described above, according to Embodiment, according to the location of the object detection region on the omnidirectional image, vertical-horizontal altering section 115 for switching the vertical size and the horizontal size of the object detection region is provided, and whether or not the object detection region is a human detection region is determined based on the vertical-horizontal size of the object detection region having the vertical size and the horizontal size switched by vertical-horizontal altering section 115. Accordingly, the human detection region and the shadow detection region are clearly separated in an omnidirectional image. Stated differently, it is possible to prevent detection of the shadow detection region as a human detection region by mistake. Accordingly, it is possible to improve accuracy in detecting a human body.

As illustrated in FIG. 7, in an omnidirectional image, the relationship between the vertical size and the horizontal size may be switched, and even in the human detection region, the vertical size H may be larger than the horizontal size W according to a location of the region. Accordingly, by merely applying the fact that the ratio of the vertical length is greater in aspect ratio and that the horizontal ratio is greater in the shadow detection region as in the conventional technology, the object detection region and the shadow detection region cannot be separated accurately.

In view of this point, in Embodiment, the human detection region and the shadow detection region are accurately separated by switching the vertical size and the horizontal size of the object detection region according to the location of the object detection region in the omnidirectional image by vertical-horizontal altering section 115 and subsequently separating the human detection region and the shadow detection region by region vertical-horizontal size determining section 116.

Furthermore, according to Embodiment, based on the direction from the center of the omnidirectional image toward the candidate human detection region, human region altering section 113 for altering the size of the standard human region is provided. Whether or not the candidate human detection region is a human detection region is determined based on the area of the candidate human detection region and the area of the standard human region, after alteration by human region altering section 113. With this, after the size of the standard human region (FIG. 6B) is adjusted to the size of the human detection region in an actual omnidirectional image (FIG. 6A), that is, after correcting the size of the standard human region; the determination on the human detection region is performed based on the area. Accordingly, the determination on the human detection region by area can be performed successfully.

Note that, human detection apparatus 100 according to Embodiment may be configured by a computer such as a personal computer including a memory and a CPU. Functions of components configuring human detection apparatus 100 can be implemented by a CPU reading a computer program stored on a memory and executing the program.

Figure 10:
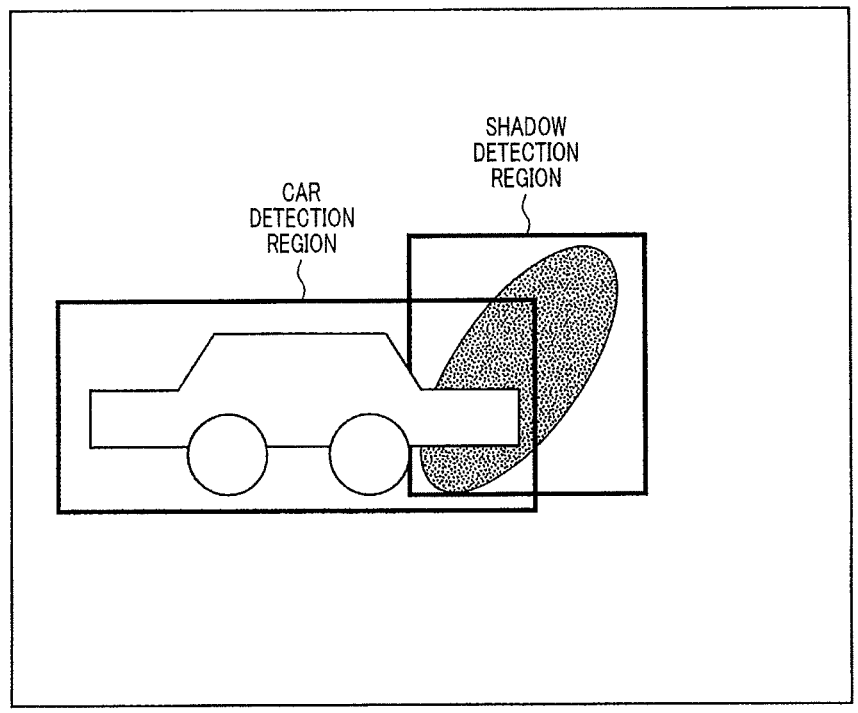
FIG. 10 illustrates shapes of a car detection region and a shadow detection region.

Although description in Embodiment uses a human body as an example, Embodiment is applicable to an object other than a human body such as an animal or a car. In particular, Embodiment is suitable for a case when an object having difference in the vertical size and the horizontal size such as a human body and a car is detected. FIG. 10 illustrates shapes of a car detection region and a shadow detection region. Applying the concept of Embodiment to regions having the relationship illustrated in FIG. 10 allows improvement on detection accuracy of an object (car) in an omnidirectional image.

The disclosure of Japanese Patent Application No. 2012-135771, filed on Jun. 15, 2012, including the specification, drawings and abstract, is incorporated herein by reference in its entirety.

INDUSTRIAL APPLICABILITY

The present invention is effective for improving the detection accuracy of a human body when detecting a human body based on the size of the object detection region in an omnidirectional image, and is suitable for an application to a monitoring system for monitoring people, for example.

REFERENCE SIGNS LIST

100 Human detection apparatus
103 Candidate region forming section
110 Size determining section
111 Standard human size generating section
112 Standard human size storage section
113 Human region altering section
114 Region area determining section
115 Vertical-horizontal altering section
116 Region vertical-horizontal size determining section

The invention claimed is:

1. An object detection apparatus comprising:
a detector that detects a candidate object from an omnidirectional image, the candidate object being a candidate of a detection target;
a detection region former that forms a candidate detection region surrounding the candidate object, the detection region having a predetermined shape that has a height and a width with respect to predetermined axes;
a storage that stores information of a standard detection region having a height and a width of the detection target with respect to the predetermined axes;
a transformer that rotates the standard detection region according to axes defined by a positional relationship between a center position of the omnidirectional image and the position of the candidate object, and generates a projected standard detection region by projecting edges of the rotated standard detection region on the predetermined axes; and
a determiner that determines whether or not the candidate object is the detection target based on a difference between a size of the candidate object detection region and a size of the projected standard detection region.

2. The object detection apparatus according to claim 1, wherein
the determiner determines whether the candidate object is the detection target based on a relationship between the height and width of the candidate detection region, and
the object detection apparatus further comprising a height-width switcher that switches, when the candidate object in the omnidirectional image is in a predetermined location, height and width of the candidate detection region before the determination based on the relationship between the switched height and width is performed.

3. A method of detecting an object, the method comprising:
detecting a candidate object from an omnidirectional image, the candidate object being a candidate of a detection target;
forming a candidate detection region surrounding the candidate object, the detection region having a predetermined shape that has a height and a width with respect to predetermined axes;
storing information of a standard detection region having a height and a width of the detection target with respect to the predetermined axes;
rotating the standard detection region according to axes defined by a positional relationship between a center position of the omnidirectional image and the position of the candidate object, and generating a projected standard detection region by projecting edges of the rotated standard detection region with respect to the predetermined axes; and
determining whether or not the candidate object is the detection target based on a difference between a size of the candidate object detection region and a size of the projected standard detection region.

4. The method of detecting an object according to claim 3, wherein the determining comprises determining whether the candidate object is the detection target based upon a relationship between the height and the width of the candidate detection region, and the method further comprising switching, when the candidate object in the omnidirectional image is in a predetermined location, height and width of the candidate detection region before the determination based on the relationship between the switched height and width is performed.

* * * * *